United States Patent [19]

Machurat

[11] Patent Number: 5,475,051
[45] Date of Patent: Dec. 12, 1995

[54] HALOBUTYL/EPOXIDIZED RUBBER MATRICES REINFORCED WITH SILICEOUS FILLER MATERIALS

[75] Inventor: Jean Machurat, Neuville sur Saone, France

[73] Assignee: Rhone-Poulenc Chimie, Courbevoie, France

[21] Appl. No.: 266,107

[22] Filed: Jun. 27, 1994

Related U.S. Application Data

[63] Continuation of Ser. No. 698,809, May 13, 1991, abandoned.

[30] Foreign Application Priority Data

May 11, 1990 [FR] France ................... 90 05887

[51] Int. Cl.$^6$ ................................. C08L 27/00
[52] U.S. Cl. .................... 524/519; 524/492; 524/493; 524/494; 524/495; 524/496; 524/442; 524/447; 525/343; 525/352; 525/359.1
[58] Field of Search ................... 524/492, 493, 524/494, 495, 496, 442, 447, 519; 525/359.1, 352, 343

[56] References Cited

U.S. PATENT DOCUMENTS

| | | | |
|---|---|---|---|
| 4,591,617 | 5/1986 | Berta . | |
| 4,818,601 | 4/1989 | Itoh et al. | 525/108 |
| 4,822,834 | 4/1989 | Blevins | 524/519 |
| 4,906,706 | 3/1990 | Hattori et al. | 525/343 |
| 5,100,947 | 3/1992 | Puydak et al. | 524/528 |

OTHER PUBLICATIONS

"Rubber to Brass Adhesion Performance Improved by Epoxidation of the Rubber", European Polymer Journal, vol. 26, No. 2 (Feb. 1990), pp. 201–206.

*Primary Examiner*—Edward Cain
*Attorney, Agent, or Firm*—Burns, Doane, Swecker & Mathis

[57] ABSTRACT

Vulcanizable elastomeric compositions comprise a halobutyl rubber matrix, an adhesion-promoting amount of a epoxidized natural rubber and a reinforcing amount of a siliceous inorganic filler material; the vulcanizates produced therefrom are well suited, for example, as impermeable sealing layers/coatings for tire carcasses.

16 Claims, 1 Drawing Sheet

HALOBUTYL/EPOXIDIZED RUBBER MATRICES REINFORCED WITH SILICEOUS FILLER MATERIALS

This application is a continuation of application Ser. No. 07/698,809, filed May 13, 1991.

FIELD OF THE INVENTION

The present invention relates to novel vulcanizable elastomeric compositions comprising a halobutyl rubber matrix and an epoxizied natural rubber reinforced with a siliceous inorganic filler material and which provide both good thermomechanical and good adhesive properties.

This invention also relates to the use of such novel compositions for the production of tires for the automotive industry, and for the production of other useful shaped articles therefrom.

2. DESCRIPTION OF THE PRIOR ART

The halobutyl rubbers are Known elastomers which present the desirable property of being highly impermeable to air and gases in general. Although the halobutyl rubbers share this property with certain other special elastomers, they are nevertheless the only ones which also have an acceptable price and are compatible with other elastomers, particularly the natural rubbers.

Elastomeric compositions based on halobutyl rubbers have important applications in the tire industry, either for the production of inner tubes or for the production of tubeless tires. In the latter event, the compositions are used in the for of thin coating sheets (a few tenths of a millimeter in thickness), namely, as a layer for sealing the inner surfaces of the carcass of tubeless tires.

These compositions generally also contain reinforcing fillers, one of the principal functions of which is to improve the mechanical properties of the elastomer.

Thus, it is known to this art to use carbon blacks as the reinforcing filler.

However, combinations of halobutyl rubbers and carbon blacks are not entirely satisfactory, principally because the resistance of such mixtures to dynamic stress, particularly bending/stretching forces, is inadequate when they are vulcanized under normal conditions. Mixtures are generally under-vulcanized to avoid this disadvantage, but then they suffer from considerable residual deformation and generate a great amount of heat under dynamic strains.

The use of silicas as reinforcing fillers is therefore considered much more promising. Indeed, with the silicas, unlike the carbon blacks, it is possible to provide both very good resistance to forces of the bending/stretching type (2 to 3 times better as the case may be) and less heating (about 15° to 20° C. less).

Nevertheless, mixtures of halobutyl rubbers and silicas are themselves not yet completely satisfactory, particularly with regard to their adhesion to certain other elastomers such as natural rubbers. To produce a perfectly safe tire, one of the conditions is that the sealing layer applied to the inner surface of the carcass of the tire should adhere perfectly to the carcass upon co-vulcanization.

In particular, in attempting to separate the two layers (the sealing layer from the carcass of the tire) by applying a mechanical force perpendicular to their contact surface, the layers must break rather than delaminate; in other words, the adhesive strength between the two layers must be greater than the force required to break the cohesive bonding in one of the two layers.

Halobutyl/silica compositions are unsatisfactory from this standpoint, as are halobutyl/carbon black compositions.

SUMMARY OF THE INVENTION

Accordingly, a major object of the present invention is the provision of novel elastomeric compositions which simultaneously have very good thermomechanical and impermeable properties and also excellent adhesion to elastomers, particularly to the natural elastomers used in the automotive tire industry (natural rubbers).

Another object of this invention is the provision of novel elastomeric compositions having the above desirable properties, without adversely affecting any of the other properties.

Briefly, the present invention features elastomeric compositions comprising a halobutyl rubber matrix reinforced with an inorganic siliceous filler material and also comprising an adhesion-promoting amount of an epoxidized natural rubber.

DETAILED DESCRIPTION OF THE PREFERRED EMBODIMENTS OF THE INVENTION

Figure 1:
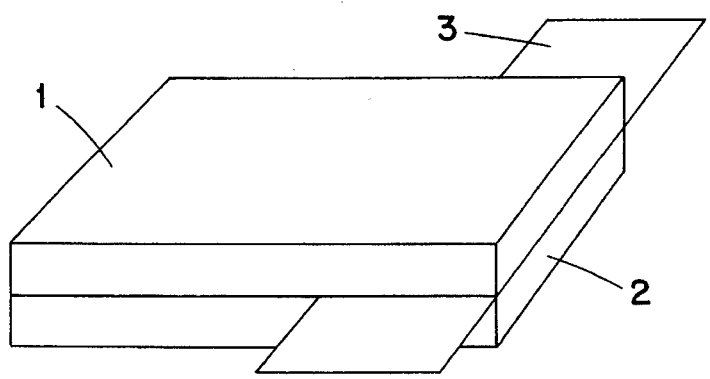
FIGS. 1 to 5 illustrate the procedure for testing the adhesion-promoting properties of the compositions of the invention.

More particularly according to the present invention, it has now surprisingly and unexpectedly been found that the properties of cohesion of elastomer compositions to tire carcass mixtures are considerably enhanced.

Cohesion at the interface is so strong that the two layers do not delaminate; the sealing layer shaped from a composition according to the invention is systematically broken, split or torn. Nor is any marked adverse change observed in the excellent thermomechanical properties of halobutyl rubber/silica mixtures. Furthermore, since epoxidized natural rubber is less impermeable than the halobutyl rubbers, a loss of impermeability was to be expected when the halobutyl rubber was replaced with epoxidized natural rubber; but this does not in fact occur, and the level of impermeability is at least maintained. Indeed, it has been found that incorporation of the epoxidized natural rubber reduces and even eliminates reversion of mixtures based on halobutyl rubber.

Elastomers of the halobutyl type are compounds which are well known to this art and widely available commercially. These are halogenated isobutene/isoprene copolymers which have long been used in the tire industry, principally because of their very low permeability to gases. These materials are vulcanizable elastomers having an average molecular weight which may range from 100,000 to 500,000, and a degree of unsaturation (introduced by the isoprene monomer) which may range from 0.1 to 5 molar percent. They are described in the text by J. A. Brydson, *Rubbery Materials and Their Compounds*, Elsevier Applied Science, New York (1988), hereby expressly incorporated by reference.

The halobutyl elastomers which are particularly suitable for the invention are the chlorobutyl and bromobutyl species. Mixtures thereof could also be used. A particularly preferred embodiment of the invention entails the use of the bromobutyl species.

The epoxidized natural rubbers (hereinafter referred to simply as ENR) are also materials which are well known to this art and are commercially available. Their degree of epoxidation may vary very widely, according to the extent of the epoxidation reaction to which the natural rubber is subjected (see again the aforenoted Brydson text). According to the invention ENRs having degrees of epoxidation ranging from 25 to 75 molar percent are particularly advantageous. In a preferred embodiment of the invention, ENRs are used having a degree of epoxidation of approximately 50 molar percent.

According to the invention, the proportions of ENR in the polymeric matrix may vary very widely. More particularly, from 1 to 50, preferably from 2 to 30 parts by weight of ENR are preferably used per 100 parts by weight of polymers (halobutyl+ENR). Too small a proportion of ENR, i.e., less than about 1 part by weight, does not effect any significant improvements in the adhesive properties, and too large a proportion of ENR may cause certain of the properties of the composition, particularly gas impermeability, to be diminished or lost.

In a particularly preferred embodiment of the invention, an optimum halobutyl/ENR ratio of from 95/5 to 85/15 is employed, expressed in parts by weight.

The siliceous inorganic filler material incorporated in the compositions according to the invention may be natural or synthetic. It may of course comprise mixtures of natural and/or synthetic siliceous materials. It is traditionally in a powdery form (powders, granules, microbeads) having a particle size ranging from a few microns to a few millimeters.

Other criteria which are very common and well known to the art of reinforcing elastomers with siliceous fillers may also be observed according to the invention. Thus, constituents will be used which are more particularly adopted to provide good mechanical properties, particularly in their ability to form a stable, homogeneous dispersion in the elastomeric matrix. These criteria are based, traditionally and by way of example only, on specific surface area, pore volume, pore volume distribution, morphology, oil absorption, loss of weight on combustion (ignition), water recovery, and the like. All of these parameters and the adjustment thereof are per se well known to this art.

Exemplary of the natural siliceous materials are natural silicas, kaolins and talcs.

The invention is more particularly applicable to synthetic materials, such as pyrogenic silicas, silica gels, precipitated silicas or metallic silicates obtained by precipitation. All of these materials are commercially available and are prepared by well known techniques.

Thus, metallic silicates may be produced, in particular, by reacting an alkali metal silicate, for example sodium silicate, with a metallic salt such as alumina sulfate. Sodium silicoaluminates are particularly exemplary of the metallic silicates.

A wide range of metallic silicates which are particularly suitable for the invention are marketed by RHONE-POULENC under the THIXOLE® trademarks.

The precipitated silicas may be prepared, for example, by hydrolyzing silicon tetrachloride in a high temperature flame (1,000° C.) or by the electric arc method. Such materials are marketed by DEGUSSA under the trademark AEROSI® or by CABOT under the trademark CABOSI®.

The silicas produced by the wet method (silica gels, precipitated silicas) are generally obtained by reacting an alkali metal silicate with an acid such as hydrochloric, sulfuric or a carboxylic acid.

The reaction may be carried out in any manner (adding acid to a charge of silicate, simultaneously adding all or part of the acid and silicate to a charge of water or silicate solutions, etc.).

The precipitated silicas are conventionally distinguished from silica gels by normal, well known criteria, particularly the fact that precipitated silicas have a highly dispersed pore distribution by reason of their discontinuous structure, whereas gels have a continuous three-dimensional structure. Precipitated silicas are generally precipitated at a pH of approximately 7 or a basic pH, while gels are normally produced at an acid or very acid pH. Silicas prepared by the wet method have the advantage of being far less expensive than silicas prepared by heating.

The precipitated silicas are particularly suitable for preparing the compositions of the invention. For example, precipitated silicas can be used which, when dried, have a BET surface area in accordance with standard NFX 11-622 (3.3), generally of 400 $m^2$/g at the maximum and preferably ranging from 50 to 250 $m^2$/g. These silicas may also display an oil absorption ranging from 50 to 400 $m^3$/100 g, in accordance with standard NFT 30-022 (March '53) using dioctyl phthalate.

An extensive range of precipitated silicas which are particularly suitable for the invention are marketed by RHONE-POULENC under the ZEOSI® trademarks.

The proportion of siliceous filler in the elastomeric matrix may vary very widely. In particular, from 1 to 100 parts by weight of siliceous filler may be used per 100 parts by weight of polymeric material (halobutyl+ENR). In a preferred embodiment of the invention, from 20 to 70 parts by weight of inorganic filler are used per 100 parts by weight of polymers.

Other than the siliceous inorganic fillers described above, certain amounts of other additives, such as carbon black or chalk, may of course also be incorporated in the elastomeric matrix according to the present invention; these amounts must nevertheless be slight relative to the proportion of siliceous filler.

Since the compositions of the invention are designed more particularly for the preparation of impermeable coating layers for tires, they may of course also contain various additives to assist the shaping thereof, particularly into the form of thin sheets. These shaping additives, such as plasticizers, lubricants, etc., are well known to this art for conventional elastomer molding operations and will not be further described.

Furthermore, again from the standpoint of tire production (although the invention is not thus restricted), the compositions of the invention may contain various additives to assist vulcanization (vulcanization by means of sulfur, metallic oxides or peroxide), such as crosslinking accelerators and/or activators. These additives are conventional for the vulcanization of elastomers.

The various coupling agents may also be incorporated in the compositions according to the invention. The primary function of such coupling agents is to improve the bonding between the fillers and elastomers, in order to enhance the mechanical properties of the vulcanized products produced therefrom (see, e.g., published French Patent Applications Nos. 2,476,666 and 2,571,721, assigned to the assignee hereof).

Finally, it is also within the scope of the present invention to include various other conventional ingredients in the subject compositions such as agents to protect against aging or organic or inorganic colorants, etc.

The compositions of the invention may be prepared by any known technique. The constituents of the compositions may be incorporated together or separately. In the latter event, it is preferable to prepare a halobutyl rubber/filler mixture and an ENR/filler mixture separately, and then to combine them in the desired optimum proportions. It is important that the mixing operation should combine all the constituents of the formulation intimately, in order to provide a composition as homogeneous as possible. The operation may be carried out, for example, in internal-type industrial mixers or in types with cylinders (designated open mixers). The compositions thus obtained (crude mixtures) can then be preformed by cutting, calendering, extrusion, winding, etc., then vulcanized either directly (salt bath, tunnel or the like) or in molds under a press, until a manufactured shaped article having mechanical properties appropriate for the desired final application is produced.

As indicated above, a particularly useful application for the compositions according to the invention is in the production of thin layers or sheets, designed to provide an impermeable, highly resistant coating on the external surface of the carcasses of tires produced from synthetic or natural elastomers, preferably natural rubber. In this event the compositions according to the invention, shaped beforehand in the form of thin sheets, are applied to the external surface of the carcass of the as yet unvulcanized tire (by the "external surface of the carcass", namely, the internal surface of the tire, is intended to be the surface which will be opposite the wheel rim). Then, all of the components of the tire are co-vulcanized in a mold under a pressure such that the internal surface of the vulcanized tire ultimately produced is coated with an elastomeric layer which adheres perfectly thereto, is perfectly impermeable and has good thermomechanical properties.

In order to further illustrate the present invention and the advantages thereof, the following specific examples are given, it being understood that same are intended only as illustrative and in nowise limitative. In said examples to follow bromobutyl and epoxidized natural rubber are referred to simply as "BBR" and "ENR".

EXAMPLES

I. Preparation of the Formulations:
Various samples were prepared to provide the following formulations (according to the invention and comparative) for testing purposes:
Formulations of the BBR/filler(s) type, including:
 (a) BBR/silica (F1)
 (b) BBR/carbon black (F10)
Formulations of the BBR/ENR/filler(s) type, including
 (a) BBR/ENR/silica (F2, F3, F4, F8, F9)
 (b) BBR/ENR/silica+talc (F5)
 (c) BBR/ENR/silica+kaolin (F6)
 (d) BBR/ENR/silica+sodium aluminosilicate (F7)
 (e) BBR/ENR/carbon black (F11)

The method for preparing formulations of the BBR/ENR/filler(s) type included blending two masterbatches in specific ratios, namely, a first BBR/filler masterbatch and a second ENR/filler masterbatch, with the compositions and the details of the operation being given below.

The formulations were prepared using:
 (i) a BBR with 2% unsaturation,
 (ii) an ENR with 50 molar % epoxidation (epoxidized natural polyisoprene),
 (iii) a ZEOSIL® silica (synthetic precipitated silica having a BET specific surface area of 80 $m^2/g$),
 (iv) an N 762 carbon black (CTAB specific surface area of 35 $m^2/g$ and DBP oil absorption of 65 m/100 g),
 (vi) a talc (micronized natural magnesia silicate),
 (vii) a kaolin (micronized natural alumina silicate),
 (viii) a TIXOLEX 15 synthetic sodium aluminosilicate (BET specific surface area of 80 $m^2/g$).

In the following description, the amounts of the various materials are given in parts by weight.

A. Preparation and Composition of BBR/Filler Masterbatches:
(Table A; Masterbatches $A_1$ and $A_2$)

TABLE A

| Components | A1 | A2 |
|---|---|---|
| BBR | 100.0 | 100.0 |
| Silica | 60.0 | — |
| Carbon Black | — | 60.0 |
| Stearic Acid | 1.0 | 1.0 |
| SUNPAR 2280 oil (1) | 15.0 | 15.0 |
| NORSOLENE SP80 (2) | 4.0 | 4.0 |
| ZnO | 4.5 | 4.5 |
| Sulfur | 0.5 | 0.5 |
| MBTS (3) | 2.0 | 2.0 |
| MgO | 1.5 | — |
| Coupling agent (4) | 3.0 | — |
| Polyethylene glycol | 3.5 | — |

(1) Naphthene oil
(2) Thermoplastic aromatic hydrocarbon resin having low degree of olefinic unsaturation
(3) Benzothiazyl disulfide
(4) Type A 1100 aminosilane The compositions were prepared as follows: in a first stage, all of the constituents except the sulfur and ZnO were blended in an internal type mixer at 80° to 90° C. until a perfectly homogeneous mixture was obtained; in a second stage, the mixture previously obtained was blended with the sulfur and ZnO at 40° C., also in an internal type mixer.

B. Preparation and Composition of ENR/FILLER MASTERBATCHES:
(Table B: Masterbatches B1 to B5)

| Components | B1 | B2 | B3 | B4 | B5 |
|---|---|---|---|---|---|
| ENR | 100.0 | 100.0 | 100.0 | 100.0 | 100.0 |
| Silica | 60.0 | — | — | — | — |
| Carbon black | — | 60.0 | — | — | — |
| Talc | — | — | 60.0 | — | — |
| Kaolin | — | — | — | 60.0 | — |
| Aluminosilicate | — | — | — | — | 60.0 |
| SUPAR 2280 oil | 10.0 | 10.0 | 10.0 | 10.0 | 10.0 |
| ZnO | 4.0 | 4.0 | 4.0 | 4.0 | 4.0 |
| Stearic Acid | 3.5 | 3.5 | 3.5 | 3.5 | 3.5 |
| Sulfur | 1.5 | 1.5 | 1.5 | 3.5 | 3.5 |
| Coupling Agent | 1.8 | — | 0.9 | 0.9 | 0.9 |
| Polyethylene glycol | 1.8 | — | 0.9 | 0.9 | 0.9 |
| Accelerator | 2.0 | 1.2 | 1.2 | 1.2 | 1.2 |

The compositions were prepared as follows: in a first stage, all of the constituents except the sulfur, accelerator and coupling agent were blended at 140° C.–150° C. in an internal type mixer until a perfectly homogeneous mixture was obtained; in a second stage, the mixture previously obtained was blended at about 100° C. with the sulfur, accelerator and, if appropriate, the coupling agent, also in an internal type mixer.

C. Preparation and Composition of Final Formulations:

The various BBR/filler (A1 and A2) and ENR/filler (B1 to B5) masterbatches were combined in a fresh mixing operation (internal type mixer) in the following BBR/ENR ratios: 99/1; 99/5; 90/10; 80/20 and 70/30.

The ratios are expressed as parts by weight per 100 parts by weight of polymers (BBR+ENR).

All other ingredients were present in the final mixtures in the proportions of these ratios and their respective contents in the basic masterbatches. The final formulations are reported in Table I below; this Table also indicates the masterbatches from which the formulations were obtained.

II. Results Of Tests:

A. Table I reports the rheological characteristics and mechanical properties of the vulcanized materials.

The rheological measurements were determined at 170° C. using a MONSANTO RH 100S rheometer.

Vulcanization was carried out by maintaining the compositions at 170° C. for 25 minutes.

It will be appreciated that the viscosity (min. couple) of mixtures reinforced by a siliceous filler were higher than that of mixtures with a carbon black filler, but that the inclusion of ENR in the former mixtures did not result in any change. Furthermore, the degree of crosslinking level (delta couple) of the BBR/ENR/siliceous filler mixtures remained substantially constant when the content of ENR was increased.

On the other hand, for mixtures reinforced with carbon black, the degree of crosslinking increased considerably, imparting a very substantial increase in the rigidity of the vulcanized materials (over 20 hardness points and over 100% modulus), which was undesirable from the point of view of the resistance of the vulcanized materials to bending.

It will also be appreciated that the phenomenon of reversion of BBR/siliceous filler mixtures was diminished or even eliminated when the content of ENR increased. This result is all the more surprising since an ENR/silica mixture in a ratio of 100/60 (in parts by weight) exhibited very strong reversion of −25. On the other hand, the BBR/carbon black mixture reverted, and this reversion was more serious in the presence of ENR.

Finally, it will also be appreciated that the mechanical properties (particularly resistance to breaking) of BBR/siliceous filler mixtures were excellent, better than those obtained using carbon black, and that the inclusion of ENR in the former mixtures did not produce any appreciable changes.

B. Table II Reports the Adhesive and Permeability:

The following procedure was carried out in conducting the adhesion test (FIG. 1). Calendered sheets (1) 1 mm thick, producing from formulations F1 to F11, were co-vulcanized under pressure (25 minutes at 170° C.) with sheets (2) 4 mm thick, produced from two typical formulations based on natural rubber for tire carcasses: one was a natural rubber reinforced with carbon black (C1), and the other reinforced with silica (C2).

An insert (3) was placed between the two sheets to facilitate the detaching test.

Figure 2:
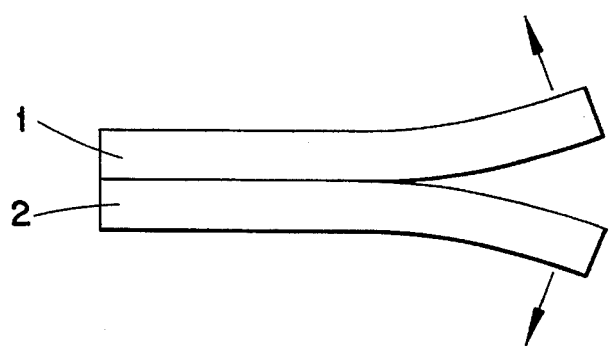

Samples were cut from the co-vulcanized block, and the level of adhesion between the two layers was determined by applying mechanical force normal to their contact surface (FIG. 2).

Figure 3:
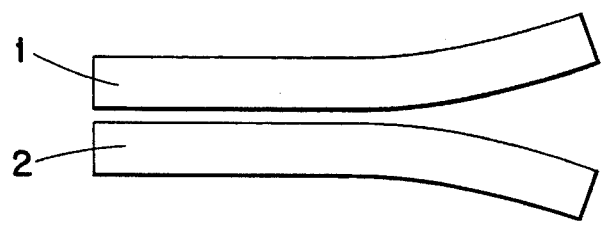
Figure 4:
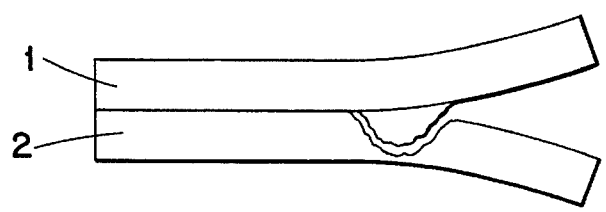
Figure 5:
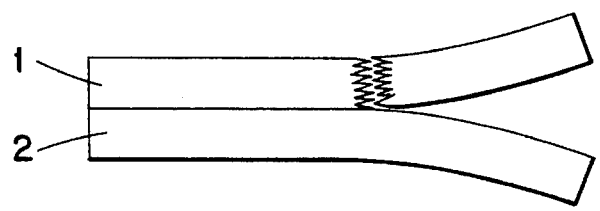

The level of adhesion was ascertained in two ways:

(1) qualitatively, by observing either detachment (FIG. 3) or splitting (FIG. 4) or breaking (FIG. 5) of the samples;

(2) quantitatively, by measuring the adhesion energy index, expressed in Joules/m$^2$(determined using a dynamometer by integrating the force-elongation curve). The higher the index, the better the adhesion.

The results reported in Table II clearly indicate the beneficial effect of including ENR in the BBR/siliceous filler composition.

It will be appreciated that there was a certain improvement in adhesion for formulation F11 containing carbon black, but only on the carcass of the silica-reinforced natural rubber type.

The coefficient of permeability, expressed in m$^2$/Pa.s, was measured with a constant volume in accordance with standard NF 46037. It will be seen that the impermeability of formulations F2 to F9 was at least maintained relative to formulation 1 without any ENR.

This was all the more surprising since a mixture of the ENR/silica type in a ratio of 100/60 (in parts by weight) had a high permeability of 3.44 m$^2$/Pa.s.

TABLE I

| FORMULATIONS | F1 | F2 | F3 | F4 | F5 | F6 | F7 | F8 | F9 | F10 | F11 |
|---|---|---|---|---|---|---|---|---|---|---|---|
| BBR content | 100 | 99 | 95 | 90 | 90 | 90 | 90 | 80 | 70 | 100 | 90 |
| ENR content | 0 | 1 | 5 | 10 | 10 | 10 | 10 | 20 | 30 | 0 | 10 |
| Nature of filler | silica | silica | silica | silica | silica + talc | silica + kaolin | silica + aluminosil | silica | silica | carbon black | carbon black |
| Mixture obtained | A1 | A1 + B1 | A1 + B1 | A1 + B1 | A1 + B3 | A1 + B4 | A1 + B5 | A1 + B1 | A1 + B1 | A2 | A2 + B2 |
| Rheology | | | | | | | | | | | |
| min. couple | 14.5 | 13.5 | 14 | 14 | 13.5 | 14 | 15 | 14 | 13.5 | 10 | 9.5 |
| delta couple | 23 | 23 | 21 | 21 | 21 | 20 | 20 | 23 | 24.5 | 18.5 | 30 |
| reversion 120 mn | −3 | −2 | −0.5 | 0 | 0 | 0 | 0 | 0 | 0 | −3.5 | −5 |
| Mechanical Properties | | | | | | | | | | | |
| hardness - Std.A | 43 | 44 | 44 | 43 | 44 | 43 | 43 | 45 | 45 | 45 | 66 |
| modulus - 100 Mpa | 1.25 | 1.4 | 1.25 | 1.4 | 1.45 | 1.4 | 1.5 | 1.65 | 1.75 | 1.2 | 2.9 |
| modulus - 300 Mpa | 6.55 | 7.05 | 6.4 | 6.8 | 6.1 | 6.2 | 6.7 | 7.2 | 7.5 | 3.7 | 7.4 |
| rupture strength (MPa) | 13.8 | 13.2 | 12.9 | 12.5 | 12.2 | 12.2 | 12.0 | 12.7 | 13.2 | 10.6 | 11.0 |
| elongation or rupture % | 566 | 514 | 536 | 507 | 536 | 525 | 499 | 497 | 510 | 781 | 523 |

TABLE II

| FORMULATIONS | F1 | F2 | F3 | F4 | F5 | F6 | F7 | F8 | F9 | F10 | F11 |
|---|---|---|---|---|---|---|---|---|---|---|---|
| Index of energy of adhesion to carcass C1(J/m²) | 15 | 28 | 40 | 53 | 28 | 24 | 50 | 52 | 50 | 38 | 23 |
|  | D | D(+) | C | R | C | C | R(−) | R | R | D | D |
| Index of energy of adhesion to carcass C2 (J/m²) | 15 | 17 | 59 | 57 | 26 | 31 | 48 | 58 | 47 | 24 | 45 |
|  | D | D(+) | R | R | C | C | C(+) | R | R(−) | C | C(+) |
| Coefficient of permeability (m²/Pa · s) | 2.42 | 2.24 | 2.36 | 2.22 | 1.76 | 2.06 | 2.22 | 2.17 | 2.32 | 1.70 | 1.75 |

D = detachment
C = splitting
R = rupture
The signs (+) or (−) indicate that the detachment, splitting or rupture was more or less pronounced.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. The vulcanizable elastomeric composition of matter, comprising a halobutyl rubber matrix, an epoxidized natural rubber (ENR) and a reinforcing amount of siliceous inorganic filler material, wherein the composition contains from 5 to 15 parts by weight of said ENR per 100 parts by weight of the halobutyl rubber+ENR.

2. The vulcanizable elastomeric composition as defined by claim 1, said halobutyl rubber comprising chlorobutyl or bromobutyl rubber.

3. The vulcanizable elastomeric composition as defined by claim 2, said halobutyl rubber comprising bromobutyl rubber.

4. The vulcanizable elastomeric composition as defined by claim 4, comprising a natural siliceous filler material.

5. The vulcanizable elastomeric composition as defined by claim 4, comprising a synthetic siliceous filler material.

6. The vulcanizable elastomeric composition as defined by claim 5, said synthetic siliceous filler material comprising a pyrogenic silica, a precipitated silica, a silica gel, a metallic precipitated silicate, or mixture thereof.

7. The vulcanizable elastomeric composition as defined by claim 6, said synthetic siliceous filler material comprising a precipitated silica.

8. The vulcanizable elastomeric composition as defined by claim 4, comprising from 1 to 100 parts by weight of said siliceous filler material per 100 parts by weight of the halobutyl rubber+ENR.

9. The vulcanizable elastomeric composition as defined by claim 8, comprising from 20 to 70 parts by weight of said siliceous filler material per 100 parts by weight of the halobutyl rubber+ENR.

10. The vulcanizable elastomeric composition as defined by claim 4, said ENR having a degree of epoxidation ranging from 25 to 75 molar percent.

11. The vulcanizable elastomeric composition as defined by claim 4, further comprising a vulcanization-assisting additive and/or a coupling agent.

12. The elastomeric composition as defined by claim 4, in vulcanized state.

13. A shaped article comprising a natural or synthetic elastomer having an impermeable/resistant coating of the vulcanizate as defined by claim 12 securedly applied thereto.

14. The shaped article as defined by claim 13, comprising a coated tire carcass.

15. The shaped article as defined by claim 13, comprising a coated tire.

16. The vulcanizable elastomeric composition as defined by claim 1, said siliceous inorganic filler material forming a stable and homogenous dispersion in the elastomeric matrix.

* * * * *